(12) United States Patent
Lindfors et al.

(10) Patent No.: US 8,244,229 B2
(45) Date of Patent: Aug. 14, 2012

(54) MOBILE VIDEO CALL RESPONSE

(75) Inventors: Juha P. Lindfors, Vantaa (FI); Juha Kallio, Helsinki (FI); Markku Jylha-Ollila, Helsinki (FI)

(73) Assignee: Nokia Corporation, Espoo (FI)

( * ) Notice: Subject to any disclaimer, the term of this patent is extended or adjusted under 35 U.S.C. 154(b) by 1131 days.

(21) Appl. No.: 11/645,383

(22) Filed: Dec. 26, 2006

(65) Prior Publication Data

US 2008/0153499 A1     Jun. 26, 2008

(51) Int. Cl.
*H04M 3/00*     (2006.01)

(52) U.S. Cl. .................. 455/418; 379/90.01; 379/93.06; 379/93.32; 379/201.12; 348/552

(58) Field of Classification Search .................. 455/418, 455/419; 348/552; 379/90.01, 93.06, 93.32, 379/201.12, 207.12–207.16, 211.03–211.04
See application file for complete search history.

(56) References Cited

U.S. PATENT DOCUMENTS

| | | | | |
|---|---|---|---|---|
| 4,939,767 | A | 7/1990 | Saito et al. ....................... | 379/53 |
| 6,961,410 | B1 * | 11/2005 | Castagna .................... | 379/88.23 |
| 2007/0030338 | A1 * | 2/2007 | Jiang et al. ................. | 348/14.01 |
| 2007/0201484 | A1 * | 8/2007 | Kenrick et al. ............ | 370/395.5 |

FOREIGN PATENT DOCUMENTS

| | | |
|---|---|---|
| CN | 1 671 160 | 9/2005 |
| WO | WO 00/22807 | 4/2000 |
| WO | WO 00/41382 | 7/2000 |
| WO | WO 02/37848 | 5/2002 |
| WO | WO 2006/094466 | 9/2006 |

OTHER PUBLICATIONS

International Telecommunication Union, H.233, Nov. 2002, "Series H: Audiovisual and Multimedia Systems; Infrastructure of audiovisual services—Systems aspects; Confidentiality system for audiovisual services", 21 pgs.

International Telecommunication Union, H.245, May 2006, "Series H: Audiovisual and Multimedia Systems; Infrastructure of audiovisual services—Communication procedures; Control protocol for multimedia communication", 333 pgs.

International Telecommunication Union, H.245, Sep. 2005, "Series H: Audiovisual and Multimedia Systems; Infrastructure of audiovisual services—Systems and terminal equipment for audiovisual services, Terminal for low-bit-rate multimedia communication", 72 pgs.

International Search Report dated Mar. 20, 2008.

* cited by examiner

*Primary Examiner* — Wayne Cai (74) *Attorney, Agent, or Firm* — Harrington & Smith (57) ABSTRACT

Ring-back content is provided to a mobile video caller willing to call a recipient in a process in which: the ring-back content is stored, a first communication leg is established between an intermediate network element and the mobile video caller, a second communication leg is established between the intermediate network element and the recipient, and the delivery of the ring-back content to the mobile video caller is started between the initiating of the mobile video call and answering to the call by the recipient. The delivery of the ring-back content may be lead by an early connect message to delay charging. On establishing the second communication leg, no connect message is passed to the caller, but the charging of the mobile video call is started.

33 Claims, 6 Drawing Sheets

Fig. 10

MOBILE VIDEO CALL RESPONSE

FIELD OF THE INVENTION

The present invention generally relates to mobile communications. The invention relates particularly, though not exclusively, to providing a mobile video call response on initiation of a mobile video call.

BACKGROUND OF THE INVENTION

Modern mobile telephones provide a rich set of features including video conferencing wherein a Circuit Switched Data (CSD) call is established between two subscribers. During the data call, video coded data is transferred over a CSD connection and decoded at the recipient terminal. A pair of CSD channels is established on the call setup to accommodate video data terminating to each of the two subscribers.

The establishing of the CSD call is time consuming in the present mobile communications systems which comply with 3GPP standards. While the data call is being built, there is no audio channel to use for relaying the normal ring back tone to calling subscriber as indication of the ringing at call recipient. Hence, the originating subscriber (A-subscriber) may be provided with a locally produced ring back tone by terminal.

In normal mobile phone speech calls, it is possible to relay a selective ring-back tone to the caller whilst the phone call is being established (while waiting for the B-subscriber to answer her phone). The selective ring back tone is a service that is typically offered as called subscriber side service in present 2G and 3G mobile communication networks for voice calls. A traditional ring back tone ("beep beep . . . ") is replaced by more attractive and personalized music tone, which can be played while the called party's terminal is being alerted. When the called subscriber answers to incoming call, the music tone is stopped and through-connection between caller and called subscriber is established by the telecommunications network.

The mechanism typically used to provide selective ring back tone service for voice calls is not, however, suitable as such to the afore described video calls due to the lack of suitable audio channel while the CSD channels are being established for a video call.

Moreover, typically Circuit Switched (CS) core network has no mechanism to terminate user plane related protocols and participate on video call specific negotiations on items such as codecs, master-slave, logical channels. Therefore, video calls are not terminated within CS core network, e.g. to Mobile Switch Centre (MSC) or Media Gateway (MGW), to be subsequently continued towards intended recipient.

Current and likely also forthcoming 3G-H324M compliant video enabled terminals do not support protocol re-negotiation at user plane level. This means in practise that if a video call were first answered by the CS core network, for instance, and ITU-H.223 and ITU-H.245 level protocol negotiations were thus successfully completed, it would be no longer possible for the video call recipient's user equipment to re-negotiate the video call specific items. The calling subscriber's terminal assumes that properties once negotiated between the calling subscriber's terminal and another peer ITU-H.223/ITU-H.245 entity remain unchanged throughout the video call.

Worse still, video call establishment includes both bearer set-up as well as user plane protocol establishment that is done after end-to-end connection through the Circuit Switched (CS) core network has been established. Hence, typically the establishment of a video call takes longer to complete than establishment of normal voice call.

CN1671160 discloses a method for realizing ring back tone and image thereof for picture phone service in mobile communication field, which contains a core network adopting calling subscriber supported phonetic and image decoding form which are resolved or preliminary arranged in calling subscriber start calling, playing ring back tone and image to calling subscriber through phonetic and image channel in Video Phone (VP) telephone series, said invention can uniformly customize ring back tone and provides its image to VP service in 3G system. This method is, however, only usable when the ring back tone and image can be transmitted over a video connection pre-established end-to-end to the called terminal.

U.S. Pat. No. 4,939,767 discloses that image data can be sent during a call establishment procedure. This publication discloses a particular arrangement in which two modems can start relaying image data faster than pre-existing fax devices. In that publication, the two modems first handshake through an open audio connection that serves as a bearer. Hence, the bearer connection is already established before the image data transfer can be started.

There are millions of commercially available terminals capable of placing mobile video calls. Any changes to the existing terminals are time consuming and costly to implement.

Hence, there is a need to provide new approach to handle network configuration which would avoid and/or mitigate the problems associated with the present technology.

SUMMARY

According to a first aspect of the invention there is provided a method, wherein on initiating a mobile video call from a first subscriber to a second subscriber, a first communication leg is established from the first subscriber to an intermediate network element, a second communication leg is established from the intermediate network element to the second subscriber, and delivery of predetermined media content from the intermediate network element to the first subscriber is started between the initiating of the mobile video call and answering to the mobile video call by the second subscriber.

Advantageously, the establishing of the first communication leg to the intermediate network element allows the predetermined video content being delivered to the first subscriber before a video call is established to the second subscriber.

The method may comprise sending of a connect message to the first subscriber responsively to one of the following: routing of the mobile video call to a media content server; the video content server issuing a command; the video content server being ready to deliver the predetermined video content; initiating the establishing of the first communication leg; and establishment of the first communication leg.

The connect message may be configured to indicate to the first subscriber that a mobile video call is established.

Advantageously, a connect message may be sent to the first subscriber relatively early considering normal time required for establishing a video call. Hence, providing a calling user with a network based feedback such as announcement may be started swiftly. Moreover, early connect messages may be sent without starting to charge the first subscriber and the charging be started at a later stage.

On initiating the mobile video call from the first subscriber to the second subscriber, the call may be routed to a media content server and responsively the video content server may cause sending of a connect message to the first subscriber.

Advantageously, by routing the call to the media content server and providing the first subscriber with the connect message, the first subscriber may be caused to start negotiating a temporary video call with the media content server to enable delivering ring-back content from the media content server to the first subscriber.

The first subscriber may be associated with a serving switch centre server and the video content server may be configured to cause the sending of the connect message to the first subscriber by sending a backward message to the serving switch centre server.

The backward message may be selected from a group consisting of an alert message and a progress message.

Advantageously, sending of an alert message or a progress message may be utilized to cause the serving switch centre to send the connect message to the first subscriber.

The establishment of the second communication leg may be started before the establishing of the first communication leg is completed.

Advantageously, starting to establish the second communication leg without waiting for the completion of the establishing of the first communication leg may reduce the time required to start the mobile video call to the second subscriber in comparison to starting to establish the second communication leg only after the first communication leg is established.

The predetermined content may comprise audio and/or video content.

The predetermined content may be content specific to the second subscriber.

The predetermined content may contain one or more of the following items: an advertisement, an announcement, live content and a recorded message.

The method may further comprise checking the accessibility of the second subscriber before the delivery of the predetermined content is started and subjecting the starting of the delivery of the predetermined content to said accessibility. The method may further comprise checking availability of necessary resources for starting the video call with the second subscriber and subjecting the starting of the delivery of the predetermined content to said availability.

By subjecting the starting of the delivery of the predetermined content to the accessibility to the second subscriber and possibly also to the availability of the necessary resources it may be possible to avoid providing the first subscriber with video call establishment related feedback when in fact the call is not possible.

The checking of the availability of necessary resources may comprise checking the current subscription of the second subscriber and/or whether video call capabilities are available in the paging area or serving cell of the second subscriber.

The method of the first aspect may further comprise charging the second subscriber on storing the predetermined content and/or on starting to deliver the predetermined content to the first subscriber.

The method of the first aspect may further comprise starting to charge the first subscriber for data transfer on starting to deliver the predetermined content to the first subscriber or on the second subscriber answering the mobile video call.

Advantageously, video announcements may be made free of charge for the caller, whilst in the present state of the art, video announcements may involve sending a connect message to the caller's user equipment thereby starting to charge the caller by the core network and thus preventing free video announcements.

The mobile video call may be a circuit switched mobile video call.

According to a second aspect of the invention there is provided an intermediate network element for connecting a mobile video call from a first subscriber to a second subscriber, comprising:
- a first negotiator configured to establish a first communication leg with the first subscriber;
- a second negotiator configured to establish a second communication leg with the second subscriber;
- a media distributor configured to start to deliver predetermined media content to the first subscriber between the initiating of the mobile video call and answering to the call by the second subscriber.

The intermediate network element may be a mobile switch centre server. Alternatively, the intermediate network element may be a media gateway.

According to a third aspect of the invention there is provided a switch centre server comprising:
- an input configured to receive from a first subscriber a mobile video call establishment request to a second subscriber associated with a media server;
- an output configured to send a video connection request for the media server;
- the input being further configured to receive a backward message from the media server;
- a processor configured to detect from the backward message that predetermined content is being provided in a temporary video call whilst the mobile video call requested by the first subscriber is being established;
- the processor being further configured to provide the first subscriber with the temporary video call with the media server.

The first subscriber may be associated with a serving switch centre server and the intermediate network element may be configured to cause the serving switch centre to send a connect message to the first subscriber by sending a backward message to the serving switch centre server.

The backward message may be selected from a group consisting of an alert message and a progress message.

The processor may be further configured to send a connect message to the first subscriber responsively to one of the following: routing of the mobile video call to a media content server; the video content server issuing a command having issued a command; the video content server being ready to deliver the predetermined video content; initiating the establishing of the first communication leg; and establishment of the first communication leg The processor may be further configured to send a connect message to the first subscriber on providing the first subscriber with the temporary video call.

The processor may be further configured cause the switch centre server to wait for a charging start message from the media server and until that message abstain from charging the first subscriber for the temporary video call.

The output may be further configured to indicate to the media server that the switch centre server is configured to process the temporary video call between the first subscriber and the media server.

According to a fourth aspect of the invention there is provided a computer program stored in a computer readable medium, the computer program comprising computer executable program code adapted to control an apparatus on initiating a mobile video call from a first subscriber to a second subscriber, the computer program comprising:

computer executable program code configured to enable the apparatus to establish a first communication leg from the first subscriber to an intermediate network element;

computer executable program code configured to enable the apparatus to establish a second communication leg from the intermediate network element to the second subscriber; and computer executable program code configured to enable the apparatus to start delivering of predetermined media content from the intermediate network element to the first subscriber between the initiating of the mobile video call and answering to the call by the second subscriber.

According to a fifth aspect of the invention there is provided computer program stored in a computer readable medium, the computer program comprising computer executable program code adapted to control a switch centre server, comprising:

computer executable program code configured to enable the switch centre server to receive from a first subscriber a mobile video call establishment request to a second subscriber associated with a media server;

computer executable program code configured to enable the switch centre server to send a video connection request for the media server;

computer executable program code configured to enable the switch centre server to receive a backward message from the media server;

computer executable program code configured to enable the switch centre server to detect from the backward message that predetermined content is being provided in a temporary video call whilst the mobile video call requested by the first subscriber is being established;

computer executable program code configured to enable the switch centre server to provide the first subscriber with the temporary video call with the media server.

The computer executable program code aspect may consist of program code executable by any one of the following: a multipurpose processor; a microprocessor; an application specific integrated circuit; a digital signal processor; and a master control processor or a field-programmable gate array.

According to a sixth aspect of the invention there is provided a subscriber terminal comprising:

a user interface configured to input a user selection of a desired ring-back content;

a transmitter configured to transmit the selection to an intermediate network element so as to configure the intermediate network element to use the selected ring-back content for delivery as a ring-back content responsive to mobile video calls addressed to the subscriber terminal.

The subscriber terminal may further comprise a receiver for receiving a confirmation from the intermediate element for successful transmission of the selection.

The user interface may be configured to record the desired ring-back content.

The subscriber terminal may further be configured to receive tariffing information from the intermediate network element and present an indication of charging to be applied following delivery of the desired ring-back content to mobile video callers.

According to a seventh aspect of the invention there is provided a method in subscriber terminal comprising:

receiving a user selection of a desired ring-back content;

transmitting the selection to an intermediate network element so as to configure the intermediate network element to use the selected ring-back content for delivery as a ring-back content responsive to mobile video calls addressed to the subscriber terminal.

According to an eighth aspect of the invention there is provided a computer program stored in a computer readable medium, the computer program comprising computer executable program code adapted to control a subscriber terminal, comprising:

computer executable program code configured to enable the subscriber terminal to receive a user selection of a desired ring-back content;

computer executable program code configured to enable the subscriber terminal to transmit the selection to an intermediate network element so as to configure the intermediate network element to use the selected ring-back content for delivery as a ring-back content responsive to mobile video calls addressed to the subscriber terminal.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED DESCRIPTION

Some embodiments of the invention will next be described to illustrate how to implement selective ring back tone for Circuit Switched (CS) video call based on 3GPP standards. These embodiments are intended to be compatible with existing and forthcoming terminals that comply with relevant 3GPP standards related to the 3G ITU-H.324M (3G-324M in short) video telephony. The invention may also be used in connection with any other communications standards and/or video protocols.

As can be understood based on the prior art section, it is not even possible in the present CS networks to provide any announcements for 3G-324M video call from network side. Therefore it has been studied whether call announcements such as "the number you have dialed is not in use" could be provided by Mobile Switch Centre (MSC) Servers (MSS) or Media Gateways (MGWs). When such announcements are required it is clear that no video call will be established to the intended recipient (B-subscriber) and thus it does not matter if the video call is terminated into a device other than the B-subscriber's equipment. However, no solutions have been presented to enable offering selective content for calls from some external server and then continue call establishment towards intended recipient. On the other hand, providing selective content by and MSS or MGW may be seen as an undue burden and complication that could at least risk their normal operation if not entirely overload them if selective ring back tones and/or video clips became popular.

Figure 1:
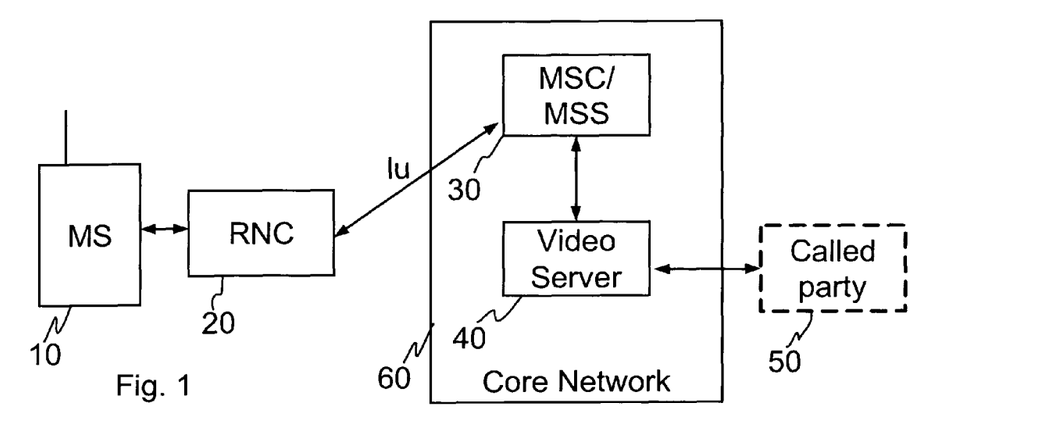
FIG. 1 shows a schematic picture of a network architecture representing the basic network elements related to an embodiment of the invention.

FIG. 1 shows a schematic picture of a network architecture 100 representing the basic network elements related to an embodiment of the invention. The network architecture 100 includes a mobile station 10 that is a terminal with video capability, a radio network controller (RNC) 20, a MSC on an MSS as commonly depicted by reference sign 30, a content server 40 here shown as a video server and a called party 50 that may employ a similar mobile station 10 as callers do. The MSC/MSS 30 and the content server 40 are also commonly referred to as a core network 60. It is understood that there are various other network elements involved as well but not shown for their description is not necessary for explaining the embodiments of the invention. For the purpose of describing different embodiments of the invention, no difference is made between operation when registered to a home MSC to a visited MSC, even though in practice advantageously the visited MSS may act as the MSS 30 referred to in the following regarding providing ring-back content to a calling subscriber.

Figure 2:
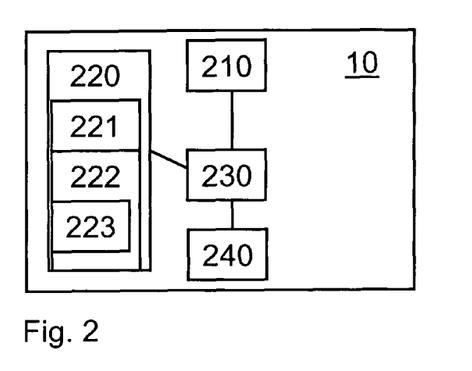
FIG. 2 shows a block diagram of a mobile station.

FIG. 2 presents a general structure of the mobile station 10. The mobile station 10 comprises a communications block 210 and a memory 220 including a work memory 221, a non-volatile memory 222 that comprises operating instructions 223 The mobile station 10 further comprises a processor 230 for executing the operating instructions and accordingly controlling other blocks of the mobile station 10, and a user interface 240 for providing output to a user and reading user input. The user interface 240 typically comprises, for data output, a display and/or a speaker. For data input, the user interface 240 typically comprises one or more of the following: dedicated buttons, soft keys, touch screen, roller, microphone, voice recognition circuitry, and pointing device. The processor is typically a master control unit MCU. Alternatively, the processor may be a microprocessor, a digital signal processor, an application specific integrated circuit, a field programmable gate array, a microcontroller or a combination of such elements. The mobile station may be a fixed network terminal such as a PSTN or ISDN terminal or a mobile terminal such as a cellular or satellite terminal compatible with a standard or proprietary communications protocol.

Figure 3:
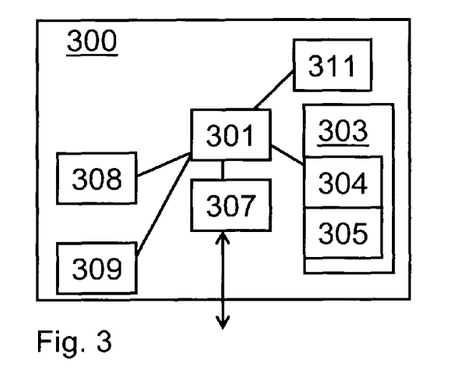
FIG. 3 shows a block diagram of a network server.

FIG. 3 presents a simplified block diagram of a server 300 capable of operating as an intermediate network entity according to an embodiment of the invention. The server 300 comprises a memory 303 for storing computer program code 304, a processor 301 for controlling the operation of the server using the computer program code 304, a work memory 305 for running the computer program code 304 by the processor 301, a communication port 307 for communicating with other network elements and/or with subscriber terminals, a user interface 308 including data input and output circuitry, and a database 309. The processor 301 may be implemented using similar means as described above in conjunction with a processor in a mobile station.

Figure 4:
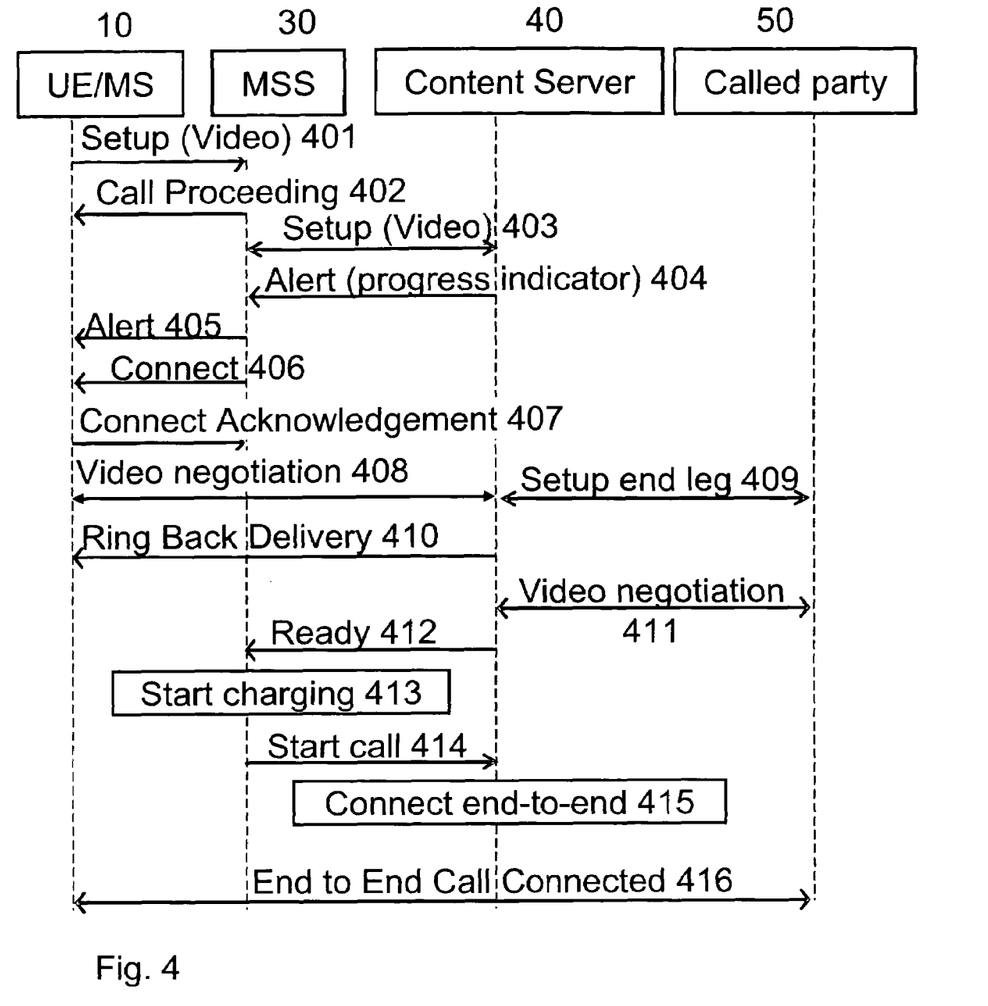
FIG. 4 shows main signaling according to an embodiment of the invention.

FIG. 4 shows main signaling according to an embodiment of the invention. The main signaling has the following signals or events:

401. The MS 10 sends a video setup message to the MSS 30 in order to set up a communication channel for a video call.
402. The MSS 30 responds by a call proceeding message.
403. The MSS 30 further sets up a communication channel for a video call with the content server 40.
404. The content server 40 responds to the MSS 30 with a backward message such as an alert message using progress indicator fields, for instance, to carry in-band information to the MSS.
405. The MSS on its turn alerts the MS 10.

Next, the MSC generates a connect message to start video protocol negotiation (such as H.223 and H.245) between the MS 10 and the content server 40 so that ring back content can be connected by the content server 40 to the MS 10.

406. The MSC sends the generated connect message to the MS.
407. The MS replies with a connect acknowledgement.
408. Next, the MS 10 and the content server 40 carry out video negotiation.

After video negotiation 408, the ring back content can be delivered or its delivery can be started from the content server 40 to the MS 10.

409. The call establishment towards the called user can also continue as a parallel process between the content server 40 and the called party 10. A circuit switched video call is established between the content server 40 and the called party 10, including normal alerting messages. The alerting message has no end-to-end meaning in this case and hence it is simply ignored by the content server.
410. After the video negotiation 409, the content server 40 starts sending ring back content via the MSS 30 to the caller.
411. After a communication channel (circuit switched call, typically) has been established between the content server 40 and to the called subscriber 10, the content server 40 performs video negotiation.
412. After video negotiation 411, the content server sends a "Ready" message to the MSS to put the MSS 30 on notice that the call is ready to be started.
413. The MSS 30 starts charging for an end-to-end video call.
414. The MSS 30 commands the content server to switch the current video call of the MS 10 to the called party 10. The content server 40 also stops sending content to the MS 10.
415. The content server 40 through-connects the MS 10 to the called party 10.
416. End-to-end call is connected.

Persons skilled in the art appreciate that the backward message 404 is adapted to identify to the availability of ringback content to the calling subscriber. It is also appreciated that some normal details have been suppressed in sake of clarity of description and that the order of the events in FIG. 4 may be altered and/or some of the events be omitted. For instance, the content server 40 may automatically start the end-to-end video call on sending the "ready" message 412 such that command 414 is not needed. Alternatively still, no ready message is sent but the MSS 30 is configured to detect the start of the video call from the content that is passed to the MS 10.

Figure 5:
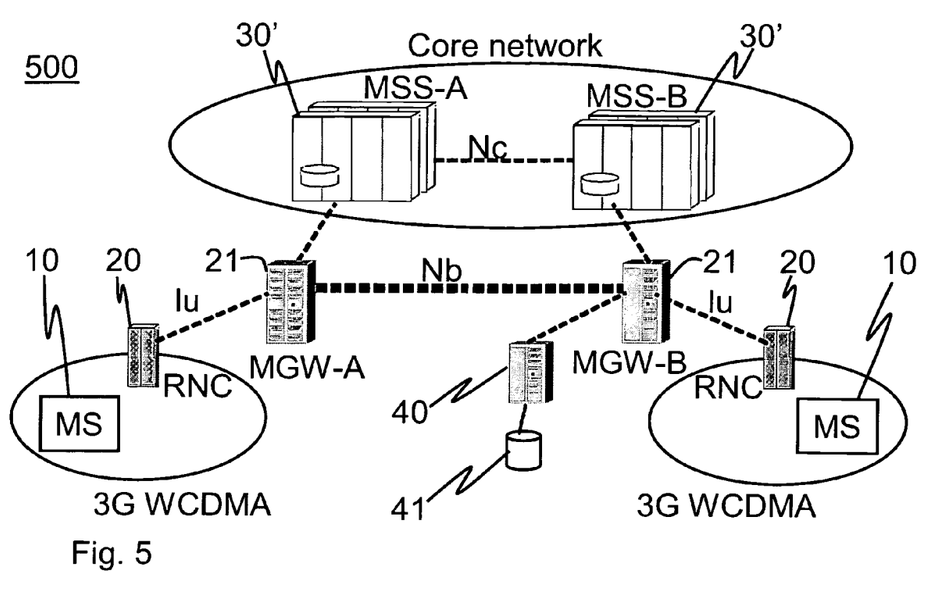
FIG. 5 shows a schematic picture of a network architecture according to an alternative embodiment to FIG. 1.

FIG. 5 shows a schematic picture of a network architecture 500 according to an alternative embodiment of the invention in which an MGW arranges a video call to be temporarily switched to a ring back content server. The network architecture 500 of FIG. 5 contains, in addition to elements of FIG. 1, two separate media gateways 21 illustrated as MGW-A 30' and MGW-B 30' as representing MGW's at the caller's and called party's ends. Similarly, MSS-A and MSS-B illustrate the MSS's of different ends so that these need not be physically or functionally any different from each other, but only they happen to function for the call being described as the ends of the caller and called party, respectively. The MSS 30' may include normal elements such as a VLR, an MSC and a service control point (SCP) for Intelligent Network services. The content server 40 of FIG. 5 is shown with a separate database 41 for content files. In this embodiment, actual ring back content logics or intelligence may be seen to reside at the MSS-B. The circuit switched interface between the RNC 20 and the MGW 21 is denoted as IuCS; the Nb interface between media gateways as Nb and the interface between MSS's as Nc. The Nb interface may use ATM Adaptation Layer 2 (AAL2), Internet Protocol (IP) and/or Time Division Multiplex (TDM) protocols and the Nc interface may use BICC, ISUP, SIP-T/I and/or other protocols as is know in the art. The MSS 30' typically control or run the functions of MSC, Visitor Location Register (VLR) and/or Service Control Point (SCP). On the interface between the MGW 21 and the content server 40, protocols such as ISUP, Primary Rate Access) PRA and/or SIP may be used.

It should be appreciated that any reference to video as a ring-back content type is only meant for illustration of capability of an embodiment and that the invention further covers use of any other media content in addition or instead of video. The same also applies to any following reference to any given media type unless express statement is made to the sole intention to discuss only some particular media type.

The different network elements connect to and communicate with each other using normal mechanisms such as Bearer Independent Call Control (BICC), ISDN Subscriber User Part (ISUP), Session Initiation Protocol (SIP) and so on.

In an embodiment according to FIG. 5, a video call is first negotiated such that video protocol layers are terminated at the originator's side of the MGW-B.

Figure 6:
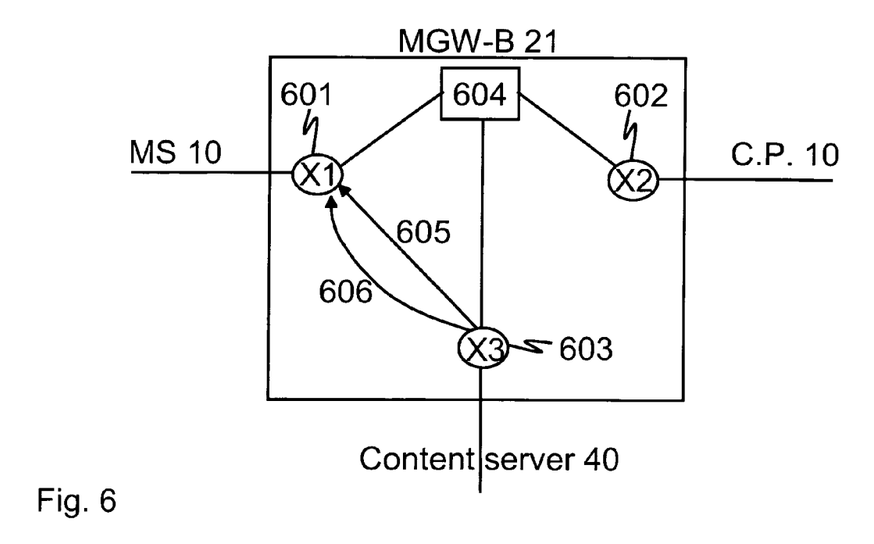
FIG. 6 shows a schematic diagram of a media gateway of FIG. 5.

FIG. 6 shows a schematic diagram of a media gateway MGW 21 of FIG. 5. The MGW 21 has a first content protocol termination port 601, a second content protocol termination port 602 and a third content protocol termination port 603 that may be arranged to connect toward the calling subscriber, the called subscriber and a ring back tone server, respectively. The MGW 21 also comprises a processor 604 configured to terminate a first leg of a video connection and forward ring back video content from the ring back tone server toward the calling subscriber. The processor also has a connection to the second content protocol termination port in order to control video negotiation with the called party 10. The forwarding may be configured to occur before video negotiations toward the called subscriber have been concluded. FIG. 6 also illustrates logical audio and video channels for the ring back content designated as 605 and 606, respectively. The termination at ports 601 to 603 may be of TDM/AAL2/IP type.

The processor 604 may comprise a microprocessor, a digital signal processor, an application specific integrated circuit, a field programmable gate array, a microcontroller or a combination of such elements.

Figure 7:
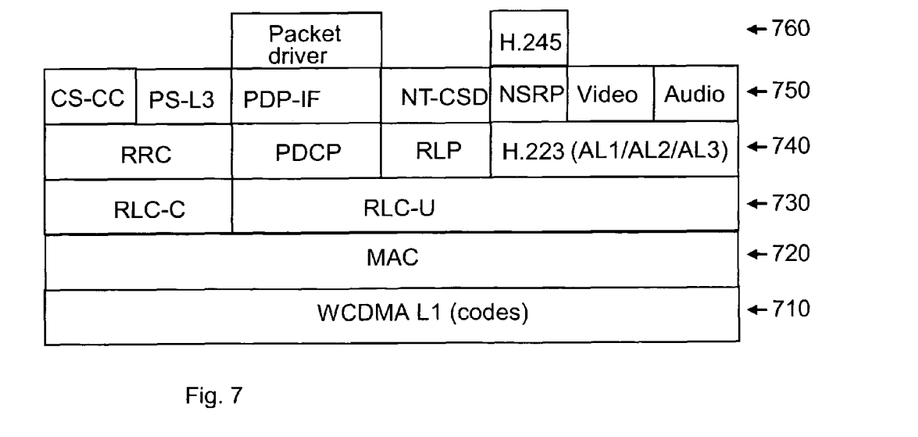
FIG. 7 shows an example on 3G-324M specific protocol stacks in both the mobile station of FIG. 5 and of the media gateway of FIG. 5.

FIG. 7 shows an example on 3G-324M specific protocol stacks in both the mobile station 10 of FIG. 5 and of the MGW 21 of FIG. 5. FIG. 7 shows the various Open Systems Interconnection (OSI) layers from layer 1 to layer 6 designated as 710 to 760 by step of 10, respectively. The protocols shown in FIG. 7 are each known from third generation mobile communications systems, particularly from UMTS.

Figure 8:
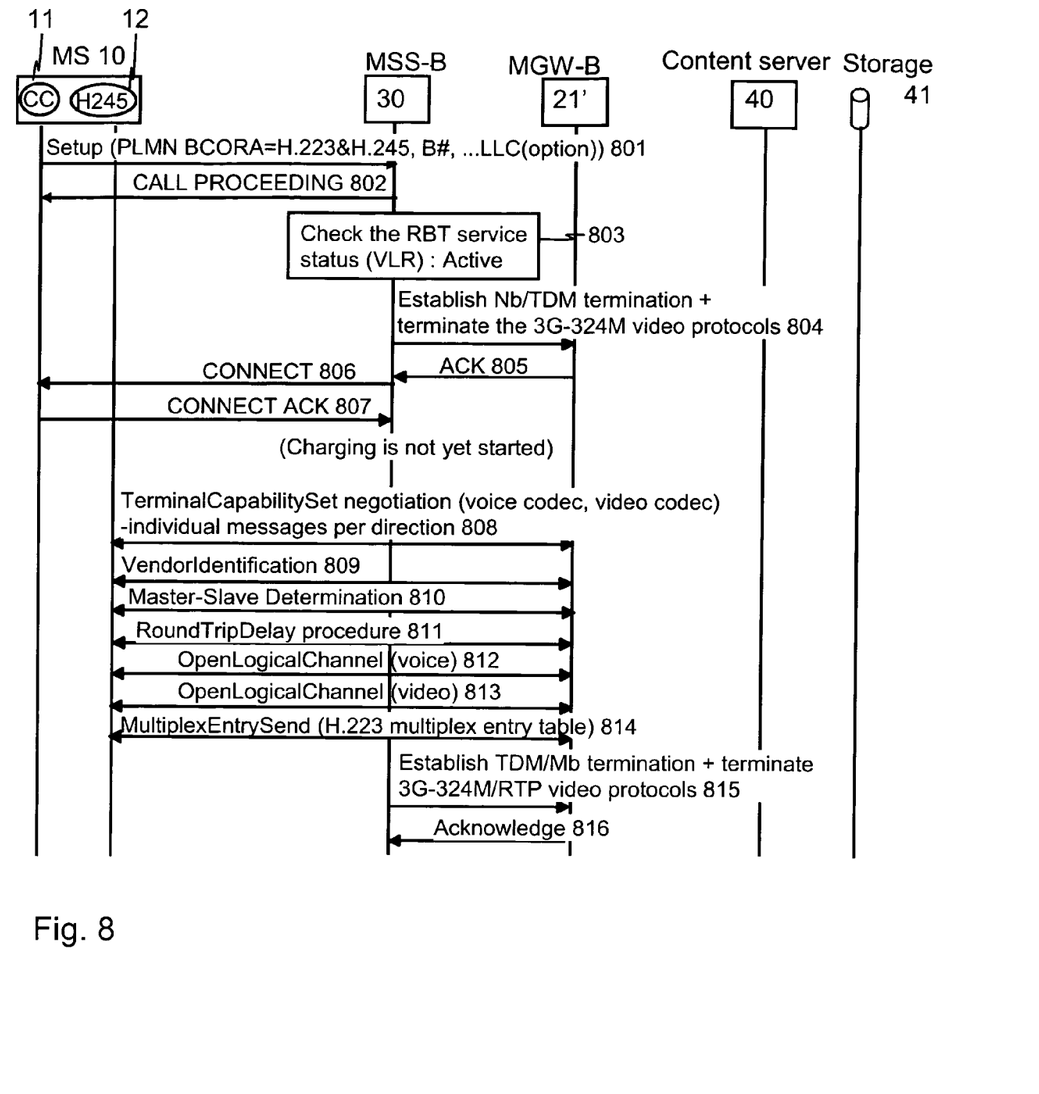
FIGS. 8 to 10 illustrate main signaling in the network architecture of FIG. 5 for starting a video call ring-back content delivery.
Figure 9:
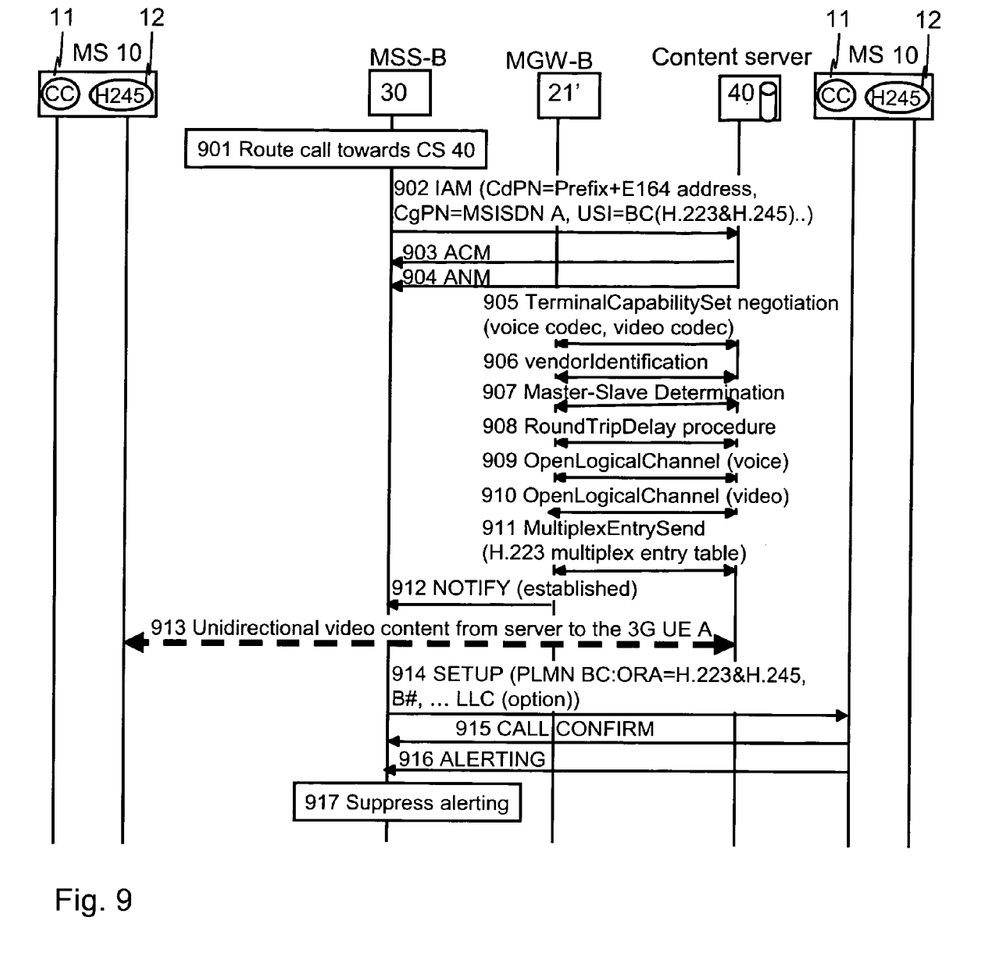
Figure 10:
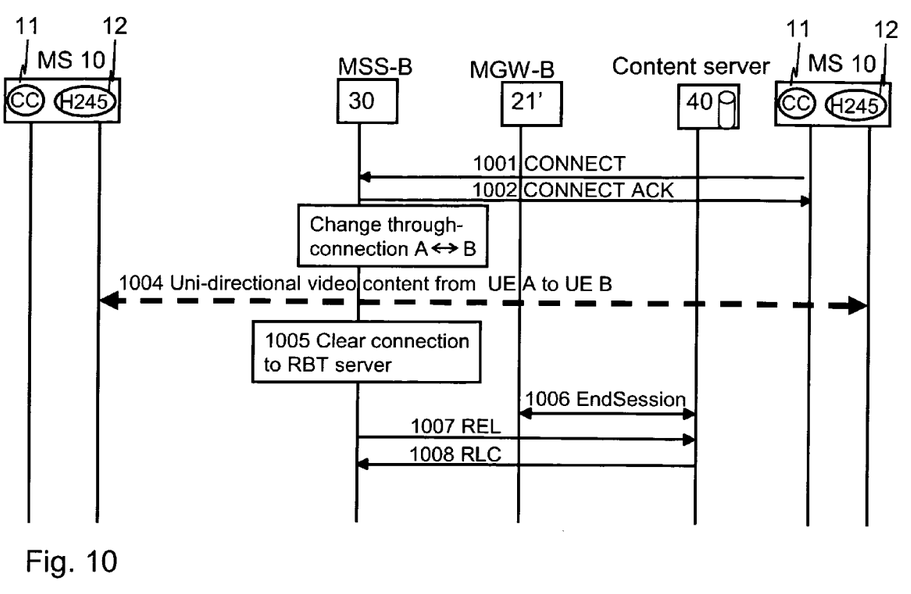

FIGS. 8 to 10 illustrate various signaling diagrams of embodiments where the MSS-B 30' may receive a call establishment request via standardized way from calling subscriber's side. For better detail, FIGS. 8 to 10 illustrate the MS with two functions: cc 11 for channel communications and media protocol unit 12 for carrying out necessary negotiations on media streaming.

The signalling in FIG. 8 starts by a setup message 801 sent from the MS 10 to the MSS 30'. The setup message 801 carries information elements typical for establishing a video call. The MSS replies by a call proceeding message 802 as usual and checks (803) if ring back content service is available. Let us assume it is in sake of feasibility of the following description; if not, the video call establishment should proceed as in the prior art. Next, the MSS 30 creates a video call termination 804 at the MGW-B 21. The MGW-B 21 responsively reserves resources needed towards the calling subscriber and acknowledges 805 the video call termination message 804. Then the MSS sends a first connect message 806 to the MS 10 that acknowledges the first connect message 807. At this stage, charging is not to be started yet; a connection is only made to the ring back content server. Next, the terminal and the MGW may exchange a series of messages 808 to 814 to negotiate capabilities for a ring-back content connection (unidirectional from the content server 40 to the MS 10). These messages may include: a terminal capability set negotiations 808 for voice codec and/or video codec with individual messages in different directions as illustrated by arrows at each end of the line demonstrating this messaging; vendor identification 809; master-slave determination 810; round-trip delay procedure 811; opening logical channel for audio 812; opening logical channel for video 813; and multiplex entry sending 814 by an H.223 multiplex entry table for instance. Next the MSS 30' establishes a suitable termination 815 at the MGW-B 21' for terminating a video and/or audio channel at the MGW-B and the MGW-B 21' acknowledges 816. At this point of time, the MGW-B 21 reserves resources towards the content server 40. Rather than using a content server 40 as here, an IP Multimedia Subsystem (IMS) standard Media Resource Function (MRF) unit or a specific video content server in a circuit switched network may be addressed.

The terminal capability set negotiation 808, vendor identification 809, master-slave determination 810, open logical channel (audio) 812, open logical channel (video) 813 and multiplex entry sending 814 may each involve individual messages per direction. The messages related to H.248 protocol are omitted in sake of clarity.

The creation of the video call termination 804 at the MGW-B 21 typically takes for a relatively long time to reserve necessary resources from the MGW towards the calling subscriber side. Hence the negotiation should start as early as possible.

Continuing from FIG. 9, once the MSS-B has the acknowledgement 816 of a successful ring back media channel termination at the MGW 21', the MSS-B routes 901 the call towards the content server 40 using a dial number prefix, for example. The MSS-B sends an ISUP Initial Address Message (IAM) 902 including the Calling Party Number, Called Party Number preceded with routing prefix, an E164 address and related data. The IAM 902 may be a standard ISUP Initial Address Message that contains the Called Party number, Calling Party number and User Service Information data (USI) that indicates that the call is Multimedia call. The MGW 21' typically replies with an ISUP Address Complete Message (ACM) 903 and with an ISUP answer message (ANM) 904 in due course. Next, the MGW-B 21 may exchange messages 905 to 911 with the content server 40. These messages correspond to those exchanged earlier between the MS 10 and the MGW-B 21 and they are needed to continue the media channel formed between the MS 10 and the MGW-B 21. Notice: H.248 messaging is not shown in sake of simplicity. Next, the MGW-B notifies 912 the MSS-B 30' on established logical channel or channels. The content server 40 next starts to transfer the ring-back content to the MS 10 or the media protocol unit 12 more specifically. The MSS-B 30' sends a setup message 914 to the called terminal 10 in order to proceed the video call establishment to the called terminal. After the called party's terminal has received the message 914 from MSS-B 30' and checked whether or not call can be accepted, called MS 10 alerts its user e.g. by playing a local ringing tone.

The terminal capability set negotiation 905, vendor identification 906, master-slave determination 907, open logical channel (audio) 909, open logical channel (video) 910 and multiplex entry sending 911 may each involve individual messages per direction.

The setup message 914 is typically followed by a call confirm message 915 and alerting message 916 intended to cause alerting tone to be presented to the caller. This alerting message 916 has no end-to-end meaning due the fact that the calling subscriber's MS 10 has already received a corresponding alerting indication message from the CS network even before ring back content delivery started. Hence, the alerting is suppressed 917.

Turning next to FIG. 10, when the called subscriber answers the phone, a connect message 1001 is sent from the called MS 10 or its CC part 11 to the MSS-B 30'. The MSS-B 30' acknowledges 1002 the connect message 1001 and next changes the connection between the content server 40 and the caller MS 10 into a through-connection between the caller and called MS 10. The MGW-B 21 typically first negotiates the video and/or voice channel parameters with the caller terminal and only thereafter connects the logical channels between the caller and called MS 10. First, between the two terminals, a unidirectional channel 1004 may be reserved from the caller to the called MS, next the connection from the caller to the content server may be cleared away 1005, although the exact order of these steps is not essential to the invention. The session between the MGW-B 21 and the content server 40 is then ended 1006, the channel between the MSS-B 30' and the content server 40 released 1007 and an RLC message 1008 is sent back from the content server 40 to the MSS-B 30'.

Alternatively to waiting for the starting of transfer of the ring-back content to the MS 10, the setup message 914 may be sent before the ring-back content transfer starts.

It should be noticed that when the MSS-B sends the first connect message 806 to the caller MS 10, charging for calling subscriber would be started from this event unless prevented by particular measures. In other words, receiving ring back tone or content, more generally, would be chargeable for the subscriber. If such a business model is not desired, but it were desired to implement free-of-charge (to caller) ring back content, the charging should be stopped for the time ring back content is provided. There are different embodiments to realize the non-charged reception of ring-back content:

Sending an answer message with a backward call-indicator having value "no charge". This would need to be interpreted by calling subscriber's local exchange or MSC/MSC Server in order to keep call free of charge.

Sending another message with a suitable indicator or other parameter adapted to cause calling party's MSC or MSS to send a connect message to calling subscriber's terminal.

In an embodiment of the invention, the MSS is configured to indicate to the media server that the MSS is capable of handling temporary video calls, or more particularly, of being able to postpone charging until the start of the actual video call after the delivery of the ring-back content. Using such an indication, it is possible to subject the delivery of the ring-back content to the MSS support so that the ring-back content is only sent when the caller is not charged for the ring-back content delivery.

Generally, it is advantageous to provide a connect message to the calling subscriber's terminal and not to activate subscriber charging until the actual video call starts. To start the charging, in an embodiment of the invention, new information is sent backwards with a charging start indication such as a particular message with a backward message indicator with a value pre-associated with starting the charging of the caller.

After establishing the first leg, that is a channel between the intermediate network entity and the calling MS 10, the call establishment may continue towards original called party as normally, which is one clear difference from how voice call related music ring back tone is provided in the present circuit switched (CS) networks. In the present CS networks, the necessary connection towards the ring back tone server is made after called party has been paged, contacted and alerting has been initiated. In case of video call all this may be done before called party's terminal has been even paged. This naturally may cause situations where resources at called party side are not available but still caller receives ring back content. To avoid at least some occasions of erroneous reception of ring back content at the caller, some embodiments of the invention use pre-paging during HLR-enquiry to ensure that called party terminal can be contacted before ring back tone is given from MSS-B to caller. It is seen that there may be occasions where called party is out of radio network coverage (such as 3G coverage) needed to accept video call. Subscriber may be within 2G-radio network coverage and still respond to the paging. However, this problem can be at least mitigated by checking whether the present paging area or serving cell of the called party has any support for video calls so that it is possible to crop out at least those situations in which there is no chance of placing a video call to the called party.

In addition to continuing video call establishment towards original called party, MSS-B also needs to reserve required resources from the MGW-B in order to act as a peer for H.223 and H.245 signaling towards called party's terminal. This way the MGW-B at the called party side will have total of three individual peers to terminate and handle H.223/H.245 protocol stacks towards calling subscriber, called subscriber and the server that provides the ring back tone content as is illustrated in FIG. 6.

It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

We claim:

1. A method, comprising:
receiving a message, from a first subscriber, initiating a mobile video call from the first subscriber to a second subscriber;
establishing a first communication leg with an intermediate network element;
receiving a backward message, wherein the backward message comprises at least one indicator field carrying progress information regarding the mobile video call;
delivering predetermined video content from the intermediate network element to the first subscriber, wherein the delivering occurs responsive to the backward message, wherein the delivering is started before the mobile video call is answered by the second subscriber, and wherein on establishing the first communication leg with the intermediate network element the mobile video call is routed to a media content server; and
delivering a connect message to the first subscriber, wherein the connect message indicates a connection with the media content server and wherein the connect message prompts the first subscriber and the media content server to carry out negotiation at least for the delivery of the predetermined video content.

2. The method according to claim 1, further comprising sending of a connect message to the first subscriber in response to at least one of the routing of the mobile video call to a media content server; a command from the media content server; the predetermined video content from a media content server being ready to be delivered to the first subscriber; initiating the establishing of the first communication leg; and establishment of the first communication leg.

3. The method according to claim 1, wherein the negotiation is further carried out for at least one of terminal capability set negotiations for a voice codec, vendor identification, master/slave determination, round-trip delay procedure, a logical channel for audio, and multiplex entry sending by an H.223 multiplex entry table.

4. The method according to claim 1, further comprising, after delivering the connect message, charging the first subscriber for the mobile video call.

5. The method according to claim 1, further comprising, based on information in the progress indicator fields, causing an alert to be presented to the first subscriber.

6. The method according to claim 1, further comprising, in response to receiving the message initiating the mobile video call from the first subscriber, sending a call proceeding message to the first subscriber.

7. The method according to claim 1, wherein the predetermined video content comprises at least one of media and video content.

8. The method according to claim 1, wherein the predetermined video content is content specific to the second subscriber.

9. The method according to claim 1, wherein the predetermined video content comprises at least one of: an advertisement, an announcement, live content and a recorded message.

10. The method according to claim 1, wherein the method further comprises checking accessibility of the second subscriber before the delivery of the predetermined video content is started and subjecting the starting of the delivery of the predetermined video content to said accessibility.

11. The method according to claim 10, wherein the method further comprises checking availability of necessary resources for starting the video call with the second subscriber and subjecting the starting of the delivery of the predetermined video content to said availability.

12. The method according to claim 11, wherein the checking of the availability of necessary resources comprises checking at least one of a current subscription of the second subscriber; video call capabilities available in a paging area of the second subscriber; and video call capabilities available in a serving cell of the second subscriber.

13. The method according to claim 1, wherein the method further comprises checking availability of necessary resources for starting the video call with the second subscriber and subjecting the starting of the delivery of the predetermined video content to said availability.

14. The method according to claim 1, wherein the method further comprises charging the first subscriber based on at least one of storing the predetermined video content and on starting to deliver the predetermined video content to the first subscriber.

15. The method according to claim 1, wherein the method further comprises starting to charge the first subscriber for data transfer at least one of on starting to deliver the predetermined video content to the first subscriber and on the second subscriber answering the mobile video call.

16. The method according to claim 1, wherein the mobile video call is a circuit switched mobile video call.

17. The method according to claim 1, wherein delivering the predetermined video content from the intermediate network element to the first subscriber is started before the second subscriber is paged for the mobile video call.

18. A method, comprising:
accepting a setting up of a first communication leg with a serving switch centre that serves a first subscriber, where the setting up is in response to a message initiating a mobile video call from the first subscriber to a second subscriber;
establishing a communication leg from an intermediate network element to the second subscriber;
sending a backward message to the serving switch centre, wherein the backward message comprises at least one indicator field carrying progress information regarding the mobile video call;
delivering predetermined video content from the intermediate network element to the first subscriber, wherein the delivering occurs responsive to the backward message, wherein the delivering is started before the mobile video call is answered by the second subscriber, and wherein on establishing the first communication leg from the intermediate network element the mobile video call is routed to a media content server; and
delivering a connect message to the first subscriber, wherein the connect message indicates a connection with the media content server and wherein the connect message prompts the first subscriber and the media content server to carry out negotiation at least for the delivery of the predetermined video content.

19. An apparatus, comprising:
at least one processor;
at least one memory including computer program code;
the at least one memory and the computer program code configured to, with the at least one processor, cause the apparatus at least to:
receive a message, from a first subscriber, initiating a mobile video call from the first subscriber to a second subscriber,
establish a first communication leg with an intermediate network element;

receive a backward message, wherein the backward message comprises at least one indicator field carrying progress information regarding the mobile video call; and deliver predetermined video content from the intermediate network element to the first subscriber, wherein the delivering occurs responsive to the backward message, wherein the delivering is started before the mobile video call is answered by the second subscriber, and wherein on establishing the first communication leg with the intermediate network element the mobile video call is routed to a media content server; and deliver a connect message to the first subscriber, wherein the connect message indicates a connection with the media content server and wherein the connect message prompts the first subscriber and the media content server to carry out negotiation at least for the delivery of the predetermined video content.

20. The apparatus according to claim 19, wherein the apparatus is embodied in one of: a mobile switch centre server; a content server; and a media gateway.

21. The apparatus according to claim 19, further comprising the at least one processor and the computer program code is configured to cause the apparatus to:
on establishing the first communication leg with the intermediate network element, route the mobile video call to a media content server; and
deliver a connect message to the first subscriber, wherein the connect message indicates a connection with the media content server and wherein the connect message prompts the first subscriber and the media content server to carry out video negotiation at least for the delivery of the predetermined video content.

22. The apparatus according to claim 19 further comprising, the at least one processor and the computer program code are configured to cause the apparatus, based on information in the progress indicator fields, to cause an alert to be presented to the first subscriber.

23. The apparatus according to claim 19, wherein delivering the predetermined video content from the intermediate network element to the first subscriber is started before the second subscriber is paged for the mobile video call.

24. An apparatus, comprising:
at least one processor;
at least one memory including computer program code;
the at least one memory and the computer program code configured to, with the at least one processor, cause the apparatus at least to:
receive from a first subscriber a mobile video call establishment request to a second subscriber associated with a media server;
send a video connection request for the media server;
receive a backward message from the media server, wherein the backward message comprises at least one indicator field carrying progress information regarding the mobile video call;
detect from the backward message that predetermined content is being provided in a temporary video call while the mobile video call requested by the first subscriber is being established, wherein the predetermined content is being provided responsive to the backward message;
provide the first subscriber with the temporary video call with the media server; and
deliver a connect message to the first subscriber, wherein the connect message indicates a connection with the intermediate network element and wherein the connect message prompts the first subscriber and the intermediate network element to carry out negotiation at least for the delivery of the predetermined content for the mobile video call.

25. The apparatus according to claim 24, wherein the negotiation is further carried out for at least one of terminal capability set negotiations for a voice codec, vendor identification, master/slave determination, round-trip delay procedure, a logical channel for audio, and multiplex entry sending by an H.223 multiplex entry table.

26. The apparatus according to claim 24, wherein the apparatus is further configured to send the connect message to the first subscriber on providing the first subscriber with the temporary video call.

27. The apparatus according to claim 24, wherein the at least one processor and the computer program code is further configured cause the apparatus to wait for a charging start message from the media server and, until that message, abstain from charging the first subscriber for the temporary video call.

28. The apparatus according to claim 24, wherein the at least one processor and the computer program code is further configured to cause the apparatus to indicate to the media server that the apparatus is processing the temporary video call between the first subscriber and the media server.

29. A non-transitory computer readable storage medium tangibly embodying a computer program code, the computer program code executable by at least one processor to perform operations comprising:
receiving a message, from a first subscriber, initiating a mobile video call from the first subscriber to a second subscriber,
establishing a first communication leg with an intermediate network element;
receiving a backward message, wherein the backward message comprises at least one indicator field carrying progress information regarding the mobile video call; and
delivering predetermined video content from the intermediate network element to the first subscriber, wherein the delivering occurs responsive to the backward message, wherein the delivering is started before the mobile video call is answered by the second subscriber, and wherein on establishing the first communication leg with the intermediate network element the mobile video call is routed to a media content server; and
delivering a connect message to the first subscriber, wherein the connect message indicates a connection with the media content server and wherein the connect message prompts the first subscriber and the media content server to carry out negotiation at least for the delivery of the predetermined video content.

30. The non-transitory computer readable storage medium according to claim 29, further comprising, based on information in the progress indicator fields, causing an alert to be presented to the first subscriber.

31. The non-transitory computer readable storage medium according to claim 29, wherein on establishing the first communication leg with the intermediate network element, the mobile video call is routed to a media content server.

32. The non-transitory computer readable storage medium according to claim 31, further comprising, delivering a connect message to the first subscriber, wherein the connect message indicates a connection with the media content server and wherein the connect message prompts the first subscriber and the media content server to carry out video negotiation at least for the delivery of the predetermined content.

33. A non-transitory computer readable storage medium tangibly embodying a computer program code, the computer program code executable by at least one processor to perform operations, the operations comprising:
- receiving from a first subscriber a mobile video call establishment request to a second subscriber associated with a media server;
- sending a video connection request for the media server;
- receiving a backward message from the media server, wherein the backward message comprises at least one indicator field carrying progress information regarding the mobile video call;
- detecting from the backward message that predetermined content is being provided in a temporary video call while the mobile video call requested by the first subscriber is being established, wherein the predetermined content is being provided responsive to the backward message;
- providing the first subscriber with the temporary video call with the media server; and
- delivering a connect message to the first subscriber, wherein the connect message indicates a connection with the intermediate network element and wherein the connect message prompts the first subscriber and the intermediate network element to carry out negotiation at least for the delivery of the predetermined content for the mobile video call.

* * * * *